US012113282B2

(12) United States Patent
Saraf

(10) Patent No.: US 12,113,282 B2
(45) Date of Patent: Oct. 8, 2024

(54) AUTOMATIC BEAM STEERING SYSTEM FOR A REFLECTOR ANTENNA

(71) Applicant: MTI WIRELESS EDGE LTD., Rosh Ha'ayin (IL)

(72) Inventor: Israel Saraf, Beit-el (IL)

(73) Assignee: MTI WIRELESS EDGE LTD., Rosh Ha'ayin (IL)

( * ) Notice: Subject to any disclaimer, the term of this patent is extended or adjusted under 35 U.S.C. 154(b) by 254 days.

(21) Appl. No.: 17/846,659

(22) Filed: Jun. 22, 2022

(65) Prior Publication Data

US 2023/0155297 A1 May 18, 2023

(30) Foreign Application Priority Data

Nov. 17, 2021 (IL) .......................................... 288183

(51) Int. Cl.
*H01Q 19/19* (2006.01)
*H01Q 3/18* (2006.01)
*H01Q 13/10* (2006.01)

(52) U.S. Cl.
CPC ............. *H01Q 19/193* (2013.01); *H01Q 3/18* (2013.01); *H01Q 13/10* (2013.01)

(58) Field of Classification Search
USPC ........................................................... 343/761
See application file for complete search history.

(56) References Cited

U.S. PATENT DOCUMENTS 2,956,248 A 10/1960 Strand et al.
4,786,913 A * 11/1988 Barendregt ............. H01P 1/064 333/248
6,943,750 B2 * 9/2005 Brooker .................... H01Q 3/18 343/781 CA
8,963,790 B2 2/2015 Brown et al.
10,110,274 B2 * 10/2018 Britz ........................ H04B 3/36
2002/0075197 A1 * 6/2002 Shrader .................. H01Q 19/19 343/840
2014/0312251 A1 10/2014 Barbet
(Continued)

FOREIGN PATENT DOCUMENTS

EP 0 759 625 A1 2/1997
EP 1408581 A 4/2014
GB 2553302 A 3/2018
(Continued)

OTHER PUBLICATIONS

Magnetostatic Force Tutorial—http://www.mweda.com/cst/cst2013/mergedProjects/Examples_Overview_EMS/examplesoverview/tutorials/linear_motor.htm (no date).
(Continued)

*Primary Examiner* — Hoang V Nguyen
*Assistant Examiner* — Brandon Sean Woods
(74) *Attorney, Agent, or Firm* — Browdy and Neimark, PLLC

(57) ABSTRACT

An antenna comprises a main reflector, a waveguide, wherein at least part of the waveguide protrudes towards a region external to the antenna, wherein the antenna is operative to transmit electromagnetic radiations between the waveguide and the main reflector, a mechanism which enables displacement of at least part of the waveguide with respect to the main reflector, and an actuator operative to displace the at least part of the waveguide.

20 Claims, 9 Drawing Sheets

(56) References Cited

U.S. PATENT DOCUMENTS

| | | | |
|---|---|---|---|
| 2019/0034167 | A1 | 1/2019 | Braganca |

FOREIGN PATENT DOCUMENTS

| | | | | | |
|---|---|---|---|---|---|
| JP | 2002185233 | A | | 6/2002 | |
| JP | 2002299940 | A | | 10/2002 | |
| WO | 2018041832 | A1 | | 3/2018 | |
| WO | WO-2022063439 | A1 | * | 3/2022 | ........... H01Q 19/193 |

OTHER PUBLICATIONS

Carpino, Francesca & Moore, Lee & Chalmers, Jeffrey & Zborowski, Maciej & Williams, Philip. (2005), "Quadrupole magnetic field-flow fractionation for the analysis of magnetic nanoparticles", Journal of Physics: Conference Series. 17. 174. 10.1088/1742-6596/17/1/0249WO 2018/041832.

Linear Motors Application Guide Aerotech—https://www.gmp.ch/htmlarea/pdf/Linear_motor_Guide.pdf (no date).

Hiemstra, et al., Performance Tradeoffs Posed by Moving Magnet Actuators in Flexure-Based Nanopositioning, IEEE/ASME Transactions on Mechatronics, IEEE Service Center, Piscataway, NJ, US, 19 (1):201-212 (Feb. 1, 2014).

Lee, et al., Simultaneous Design Optimization of Permanent Magnet, Coils, and Ferromagnetic Material in Actuators, IEEE Transactions on Magnetics, 47(12):4712-4716 (Dec. 2011).

* cited by examiner

AUTOMATIC BEAM STEERING SYSTEM FOR A REFLECTOR ANTENNA

CROSS-REFERENCE TO A RELATED APPLICATION

The present application claims benefit from IL288183 filed on Nov. 17, 2021.

TECHNICAL FIELD

The presently disclosed subject matter relates to antennas. In particular, it relates to new systems and methods for a reflector antenna, such as a dish antenna.

BACKGROUND

Dish antennas are antennas which include a dish and a feed. The antenna may be subject to vibrations, which alter the beam direction transmitted or received by the antenna and therefore degrade performance of the antenna.

Documents which constitute background to the presently disclosed subject matter include:

U.S. Pat. No. 8,963,790B2;

U.S. Pat. No. 2,956,248A;

U.S. Pat. No. 4,786,913A;

U.S. Pat. No. 6,943,750B2;

EP1408581A2;

US20190341671A1;

www.mweda.com/cst/cst2013/mergedProjects/Examples_Overview_EMS/examplesoverview/tutorials/linear_motor.htm; and Carpino, Francesca & Moore, Lee & Chalmers. Jeffrey & Zborowski, Maciej & Williams, Philip. (2005), "*Quadrulxole magnetic field-flow fractionation for the analysis of magnetic nanoparticles*". Journal of Physics: Conference Series. 17. 174. 10.1088/1742-6596/17/1/024.

Acknowledgement of the above references herein is not to be inferred as meaning that these references are in any way relevant to the patentability of the presently disclosed subject matter.

There is now a need to propose new solutions for improving the structure and operation of antenna(s), and in particular of dish antennas.

GENERAL DESCRIPTION

In accordance with certain aspects of the presently disclosed subject matter, there is provided an antenna, comprising a main reflector, a waveguide, wherein at least part of the waveguide protrudes towards a region external to the antenna, wherein the antenna is operative to transmit electromagnetic radiations between the waveguide and the main reflector, and a mechanism which enables displacement of at least part of the waveguide with respect to the main reflector, and an actuator operative to displace the at least part of the waveguide.

In addition to the above features, the antenna according to this aspect of the presently disclosed subject matter can optionally comprise one or more of features (i) to (xix) below, in any technically possible combination or permutation:

i. at least part of the waveguide protrudes from the main reflector, or the waveguide is coupled to a first waveguide, wherein at least part of the first waveguide protrudes from the main reflector;

ii. a position of the mechanism matches a position of a vertex of the main reflector according to a proximity criterion;

iii. the mechanism is located at an interface between the first waveguide and the waveguide;

iv. the mechanism enables at least one of a displacement in azimuth of the at least part of the waveguide, or a displacement in elevation of the at least part of the waveguide;

v. the mechanism includes a ball joint;

vi. the antenna comprises a sensor generating data usable to determine data $D_{motion}$ informative of a displacement of the antenna, and a controller operative to obtain data $D_{beam}$ informative of a required beam direction of electromagnetic radiations to be received or transmitted by the antenna, and determine a displacement $D_{corrective}$ for the at least part of the waveguide using $D_{motion}$ and $D_{beam}$;

vii. the controller is operative to determine a displacement $D_{corrective}$ for the at least part of the waveguide using $D_{motion}$ and $D_{beam}$, for which a beam direction of electromagnetic radiations received or transmitted by the antenna, after said displacement $D_{corrective}$ of said at least part of the waveguide, matches the required beam direction according to a matching criterion;

viii. the antenna comprises a first sensor generating data usable to determine data informative of a displacement of the antenna in a first range of frequencies, and a second sensor generating data usable to determine data informative of a displacement of the antenna in a second range of frequencies, wherein an average frequency of the first range is below an average frequency of the second range;

ix. the controller is operative to control an actuator of the antenna to move the at least part of the waveguide according to said displacement $D_{corrective}$;

x. the mechanism comprises a first element operatively coupled to a second element, wherein a gap between the first element and the second element has a dimension which is below a tenth of a wavelength informative of a range of wavelengths in which the antenna operates;

xi. the antenna comprises a magnet coupled to the at least part of the waveguide;

xii. the antenna comprises a first ferromagnetic element, a first inductor associated with the first ferromagnetic element, and a second ferromagnetic element, wherein an electric current generated in the first inductor enables displacement of the magnet and of the at least part of the waveguide;

xiii. the antenna comprises a first ferromagnetic element, a first inductor associated with the first ferromagnetic element, a second ferromagnetic element, and a second inductor with the second ferromagnetic element, wherein an electric current generated in at least one of the first inductor or the second inductor enables displacement of the magnet and of the at least part of the waveguide;

xiv. the first ferromagnetic element is a U-shaped ferromagnetic element;

xv. the first ferromagnetic element includes a first arm located at least partially above the magnet, a second arm located at least partially below the magnet, and a third arm joining the first portion to the second portion;

xvi. the electric current enables generation of a magnetic force operative to attract or repel the magnet, thereby moving the at least part of the waveguide;

xvii. the antenna is configured to generate a first current in the first inductor, and a second current in the second inductor, wherein the second current has a sign opposite to the first current;

xviii. the antenna comprise a magnet coupled to the waveguide, a first ferromagnetic element, a first inductor associated with the first ferromagnetic element, a second ferromagnetic element, a third ferromagnetic element, a second inductor associated with the third ferromagnetic element, and a fourth ferromagnetic element, wherein an electric current generated in the first inductor enables displacement of the magnet and of the at least part of the waveguide along a first direction, and an electric current generated in the second inductor enables displacement of the magnet and of the at least part of the waveguide along a second direction, different from the first direction; and xix. the antenna comprises a third inductor associated with the second ferromagnetic element, a fourth inductor associated with the fourth ferromagnetic element, wherein electric currents generated in the first and third inductors with an opposite sign enable displacement of the magnet and of the at least part of the waveguide along the first direction, and wherein electric currents generated in the second and fourth inductors with an opposite sign enable displacement of the magnet and of the at least part of the waveguide along the second direction, different from the first direction.

In accordance with certain aspects of the presently disclosed subject matter, there is provided an antenna, comprising a main reflector, a waveguide, wherein at least part of the waveguide protrudes towards a region external to the antenna, wherein the antenna is operative to transmit electromagnetic radiations between the waveguide and the main reflector, and an actuator operative to displace at least part of the waveguide, the actuator comprising a magnet coupled to the at least part of the waveguide, a first ferromagnetic element, a second ferromagnetic element, and an inductor associated with the first ferromagnetic element or with the second ferromagnetic element.

In addition to the above features, the antenna according to this aspect of the presently disclosed subject matter can optionally comprise one or more of features (xx) to (xxix) below, in any technically possible combination or permutation:

xx. the antenna comprises a mechanism which enables displacement of the at least part of the waveguide with respect to the main reflector, xxi. the antenna comprises a magnet coupled to the at least part of the waveguide:

xxii. the antenna comprises a first ferromagnetic element, a first inductor associated with the first ferromagnetic element, and a second ferromagnetic element, wherein an electric current generated in the first inductor enables displacement of the magnet and of the at least part of the waveguide;

xxiii. the antenna comprises a first ferromagnetic element, a first inductor associated with the first ferromagnetic element, a second ferromagnetic element, and a second inductor with the second ferromagnetic element, wherein an electric current generated in at least one of the first inductor or the second inductor enables displacement of the magnet and of the at least part of the waveguide;

xxiv. the first ferromagnetic element is a U-shaped ferromagnetic element;

xxv. the first ferromagnetic element includes a first arm located at least partially above the magnet, a second arm located at least partially below the magnet, and a third arm joining the first arm to the second arm;

xxvi. the electric current enables generation of a magnetic force operative to attract or repel the magnet, thereby moving the at least part of the waveguide;

xxvii. the antenna is configured to generate a first current in the first inductor, and a second current in the second inductor, wherein the second current has a sign opposite to the first current;

xxviii. the antenna comprises a magnet coupled to the at least part of the waveguide, a first ferromagnetic element, a first inductor associated with the first ferromagnetic element, a second ferromagnetic element, a third ferromagnetic element, a second inductor associated with the third ferromagnetic element, and a fourth ferromagnetic element, wherein an electric current generated in the first inductor enables displacement of the magnet and of the at least part of the waveguide along a first direction, and an electric current generated in the second inductor enable displacement of the magnet and of the at least part of the waveguide along a second direction, different from the first direction; and xxix. the antenna comprises a third inductor associated with the second ferromagnetic element, a fourth inductor associated with the fourth ferromagnetic element, wherein electric currents generated in the first and third inductors with an opposite sign enable displacement of the magnet and of the at least part of the waveguide along the first direction, and wherein electric currents generated in the second and fourth inductors with an opposite sign enable displacement of the magnet and of the at least part of the waveguide along the second direction, different from the first direction.

In accordance with certain aspects of the presently disclosed subject matter, there is provided a method of controlling an antenna comprising a main reflector and a waveguide, the method comprising, by a processor and memory circuitry, obtaining data $D_{beam}$, informative of a required beam direction of electromagnetic radiations to be received or transmitted by the antenna, obtaining data $D_{motion}$ informative of a displacement of the antenna, and determining a displacement $D_{corrective}$ for at least part of the waveguide using $D_{motion}$ and $D_{beam}$, for which a beam direction of electromagnetic radiations received or transmitted by the antenna, after said displacement $D_{corrective}$ of said at least part of the waveguide, matches the required beam direction according to a matching criterion.

In addition to the above features, the method according to this aspect of the presently disclosed subject matter can optionally comprise one or more of features (xxx) to (xxxi) below, in any technically possible combination or permutation:

xxx. the method comprises controlling an actuator of the antenna to move the at least part of the waveguide according to said displacement $D_{corrective}$; and xxxi. the method comprises (1) obtaining data $D_{beam}$ informative of a required beam direction of electromagnetic radiations to be received or transmitted by the antenna, repeatedly performing over time (2) to (4): (2) obtaining data $D_{motion}$ informative of a displacement of the antenna, (3) determining a displacement $D_{corrective}$ for the at least part of the waveguide using $D_{motion}$ and $D_{beam}$ for which a beam direction of electromagnetic radiations received or transmitted by the antenna, after said displacement $D_{corrective}$ of said at least part of the waveguide, matches the required beam direction according to a matching criterion, and (4) controlling an actuator of the antenna to move the at least part of the waveguide according to said displacement $D_{corrective}$.

According to some embodiments, the method can include controlling an antenna as described in the various embodiments above (optionally including one or more of the features (i) to (xxix) above, in any technically possible combination or permutation).

According to some embodiments, the proposed solution provides an antenna which can be controlled to compensate vibrations affecting the beam direction of the antenna.

According to some embodiments, the proposed solution provides an accurate and efficient solution to compensate vibrations present in an antenna, such a reflector antenna (e.g. dish antenna).

According to some embodiments, the proposed solution enables real time or quasi real time control of an antenna subject to vibrations, such a reflector antenna (e.g. dish antenna).

According to some embodiments, the proposed solution improves the accuracy of control of the direction of the beam transmitted and/or received by an antenna, such as a reflector antenna (e.g. dish antenna).

According to some embodiments, the proposed solution enables efficient and accurate control of the direction of a narrow beam.

According to some embodiments, the proposed solution enables compensating vibrations present in an antenna by moving only a fraction of the antenna. As a consequence, it is possible to use smaller and less costly actuators.

According to some embodiments, the proposed solution provides a robust approach to compensate vibrations present in an antenna.

According to some embodiments, the proposed solution improves performance of antennas, such as reflector antenna (e.g. dish antennas). In particular, it improves performance of large dish antennas.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods have not been described in detail so as not to obscure the presently disclosed subject matter.

The term "processor and memory circuitry" (PMC) as disclosed herein should be broadly construed to include any kind of electronic device with data processing circuitry, which includes for example a computer processing device operatively connected to a computer memory (e.g. digital signal processor (DSP), a microcontroller, a field programmable gate array (FPGA), and an application specific integrated circuit (ASIC), etc.) capable of executing various data processing operations.

It can encompass a single processor or multiple processors, which may be located in the same geographical zone, or may, at least partially, be located in different zones and may be able to communicate together.

Unless specifically stated otherwise, as apparent from the following discussions, it is appreciated that throughout the specification discussions utilizing terms such as "obtaining". "determining", "controlling", "performing" or the like, refer to the action(s) and/or process(es) of a processor and memory circuitry that manipulates and/or transforms data into other data, said data represented as physical, such as electronic, quantities and/or said data representing the physical objects.

Figure 1A:
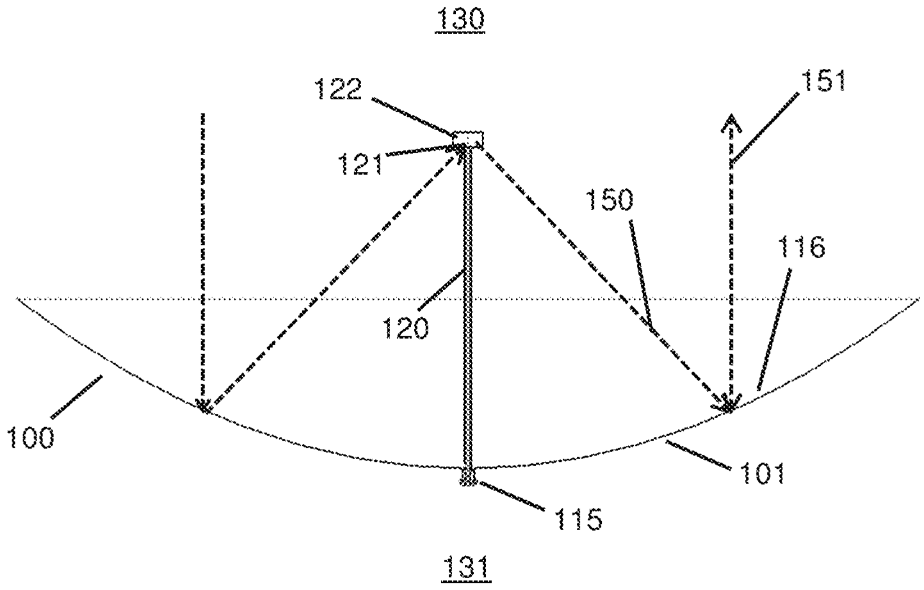
FIG. 1A illustrates an embodiment of an antenna without vibrations.

FIG. 1A illustrates an antenna 100. As visible in FIG. 1A, the antenna 100 includes a main reflector 101 (also called dish). The antenna 100 is therefore a reflector antenna.

The main reflector 101 includes a curved surface 116 which is operative to reflect electromagnetic radiations (electromagnetic waves) when the antenna 100 operates in reception and/or in transmission.

In the non-limitative example of FIG. 1A, the main reflector 101 is a parabolic reflector which has a curved surface 116 with the cross-sectional shape of a parabola, to direct the electromagnetic waves.

The antenna 100 includes a waveguide 120. The waveguide 120 can be designated as a feed waveguide 120 of the antenna 100. This term is not to be construed as limitative and used only for simplifying its designation.

At least part of the waveguide 120 protrudes towards a region 130 (space 130) external to the antenna 100.

Electromagnetic radiations are transmitted by the antenna 100 towards at least part of the space 130, or electromagnetic radiations are received by the antenna 100 from at least part of the space 130.

In some embodiments, the waveguide 120 can protrude from the main reflector 101 (see FIG. 1A, in which the waveguide 120 protrudes out of the main reflector 101 towards the space 130).

In some embodiments, the waveguide 120 is coupled to a first waveguide, wherein at least part of the first waveguide protrudes out of the main reflector 101 towards the space 130 (as explained with reference to FIG. 1E).

In some embodiments, only part of the waveguide 120 protrudes from the main reflector 101 towards the space 130 (as explained with reference to FIG. 1F, in which only part of the waveguide 120 protrudes out of the main reflector 101 towards the space 130).

An end 121 (distal end which faces the space 130) of the waveguide 120 can be connected to a reflector 122 (also called a sub-reflector 122).

The antenna 100 includes a first waveguide 115 (only partially represented in FIG. 1A). The first waveguide 115 and the waveguide 120 are operatively coupled. In particular, the antenna 100 can transmit electromagnetic radiations between the first waveguide 115 and the waveguide 120.

In some embodiments, the electromagnetic radiations are in the radio-frequency (RF) range. This is however not limitative.

In the example of FIG. 1A, the first waveguide 115 protrudes inwardly from the main reflector 101 towards an inner portion 131 of the antenna 100. The inner portion 131 includes various elements of the antenna 100 such as transceivers, low band port and/or high band port (not represented in FIG. 1A), etc.

The first waveguide 115 is connected, directly or indirectly, to one or more transceivers (not represented) of the antenna 100. The transceivers can be used to generate electromagnetic radiations transmitted by the antenna 100 and/or to process electromagnetic radiations received by the antenna 100.

When the antenna 100 operates in transmission, electromagnetic radiations are transmitted from the first waveguide 115 to the waveguide 120. The waveguide 120 transmits the electromagnetic radiations (via the sub-reflector 122) to the main reflector 101 (see arrow 150). In the absence of vibrations in the antenna 100, the main reflector 101 transmits the electromagnetic radiations as a beam along the required direction (see arrow 151 in FIG. 1A).

When the antenna 100 operates in reception, electromagnetic waves are received by the main reflector 101 and reflected by the main reflector 101 towards the waveguide 120 (via the sub-reflector 122). The waveguide 120 transmits the electromagnetic radiations to the first waveguide 115 (in order to be eventually processed by the transceivers).

As explained hereinafter, one or more elements can be present on the path of transmission between the first waveguide 115 and the waveguide 120, such as a mechanism 165 described e.g. in FIGS. 1D, 1E and IF.

Figure 1B:
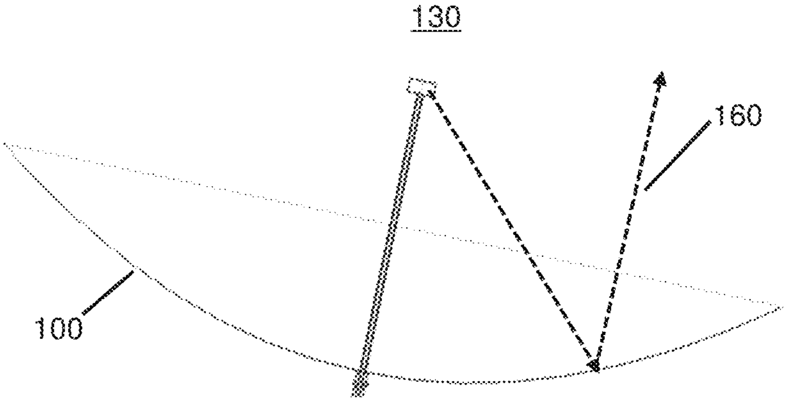
FIG. 1B illustrates an example of an effect of vibrations on an antenna which operates in transmission.

Attention is now drawn to FIG. 1B.

During operation of the antenna 100, the antenna 100 is generally submitted to vibrations. The vibrations can be caused e.g. by wind, by the platform (e.g. mast or pole) on which the antenna 100 is mounted, by human activities, by other sources of vibrations, etc. This is however not limitative.

Due to these vibrations, at least part of the structure of the antenna 100 undergoes a displacement, along one or more axes. Such displacement can include in particular a displacement (such as a rotation or tilt) in azimuth and/or in elevation (also called pitch and/or yaw rotation).

FIG. 1B illustrates an example of an effect of the vibrations on the structure of the antenna 100, when the effect of these vibrations is not compensated.

Assume for example that it is desired to transmit a beam of electromagnetic radiations along the required direction depicted by arrow 151 of FIG. 1A.

In the non-limitative example of FIG. 1B, the antenna 100 is tilted about one axis (depending on the definition of the axes this can correspond to a motion in azimuth or in elevation) due to the vibrations.

As a consequence, the beam 160 transmitted by the antenna 100 to the space 130 has a direction which differs from the required direction 151.

Figure 1C:
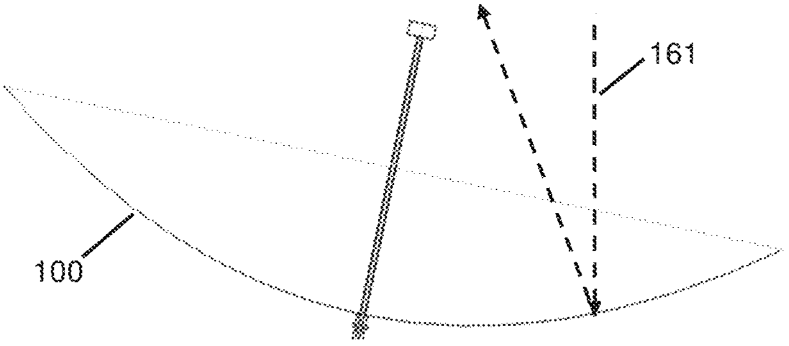
FIG. 1C illustrates an example of an effect of vibrations on an antenna which operates in reception.

Note that this problem arises also when the antenna 100 operates in reception, as visible in FIG. 1C, when the effect of the vibrations is not compensated. Assume that the antenna 100 receives electromagnetic rays (beam) 161 which are parallel to the required direction 151 (depicted in FIG. 1A). Due to the vibrations, the antenna 100 is therefore not able to collect the desired electromagnetic rays/beam (or with a poor performance).

As can be understood from the example of FIGS. 1B and 1C, if the effect of the vibrations is not compensated, the performance of the antenna is altered.

This problem is even more critical in large dish antennas, which produce a narrow beam width. The table illustrates non-limitative values of the beam width with respect to the diameter of the dish, at a frequency of 80 GHz.

| Dish diameter [feet] | Beam width [deg] |
|---|---|
| 0.5 | 1.6 |
| 1 | 0.8 |
| 2 | 0.4 |
| 4 | 0.2 |

Therefore, an error in the direction of transmission (respectively in reception) of the beam transmitted (respectively received) by the antenna strongly impacts performance of the antenna.

Figure 1D:
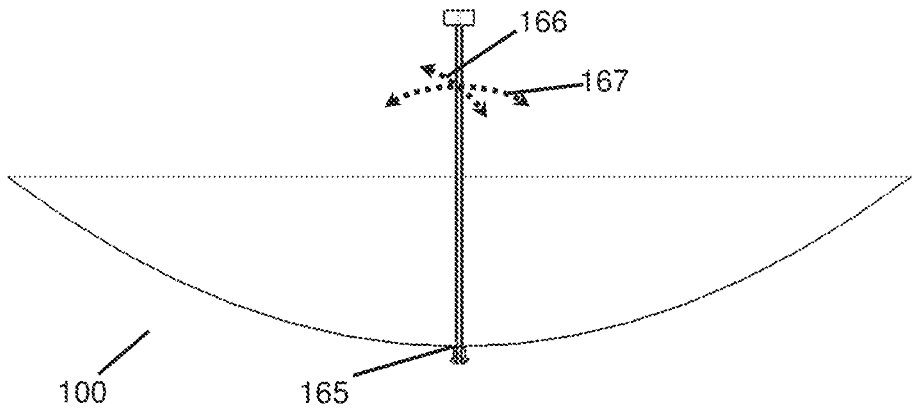
FIG. 1D illustrates an embodiment of an antenna including a mechanism enabling motion of at least part of a waveguide of the antenna.

Attention is now drawn to FIG. 1D.

In order to compensate, at least partially, for vibrations of the antenna 100, the antenna 100 includes a mechanism 165. As explained hereinafter, the mechanism 165 can include one or more mechanical elements enabling motion of at least part of the waveguide 120 with respect to the main reflector 101 and/or the first waveguide 115. In particular, it can enable a displacement in azimuth (see arrow 166) and/or elevation (see arrow 167) of at least part of (or of all of) the waveguide 120 (and of the sub-reflector 122 located at its proximal end). The displacement is e.g. a rotation or tilt in azimuth and/or elevation.

According to some embodiments, the mechanism 165 is located at an interface between the first waveguide 115 and the waveguide 120.

In a parabolic antenna (dish antenna), the vertex 164 of the main reflector 101 (parabolic reflector) is the innermost point at the centre of the parabolic reflector. According to some embodiments, the position of the mechanism 165 matches a position of the vertex of the main reflector 101 according to a proximity criterion. The mechanism 165 is generally located on an axis of revolution of the waveguide 120 (main axis Z of the waveguide 120 oriented towards the space 130), at the same level of vertex 164 of the main reflector 101, above the vertex 164 of the main reflector 101 (see FIG. 1E) or below the vertex 164 of the main reflector 101 (see FIG. 1F).

The proximity criterion can define e.g. that the distance (height) along axis Z (noted 168 in FIGS. 1E and 1F) between the mechanism 165 and the vertex 164 of the main reflector 101 is smaller than 10% of the diameter 169 of the main reflector 101. This value is however not limitative.

Figure 1E:
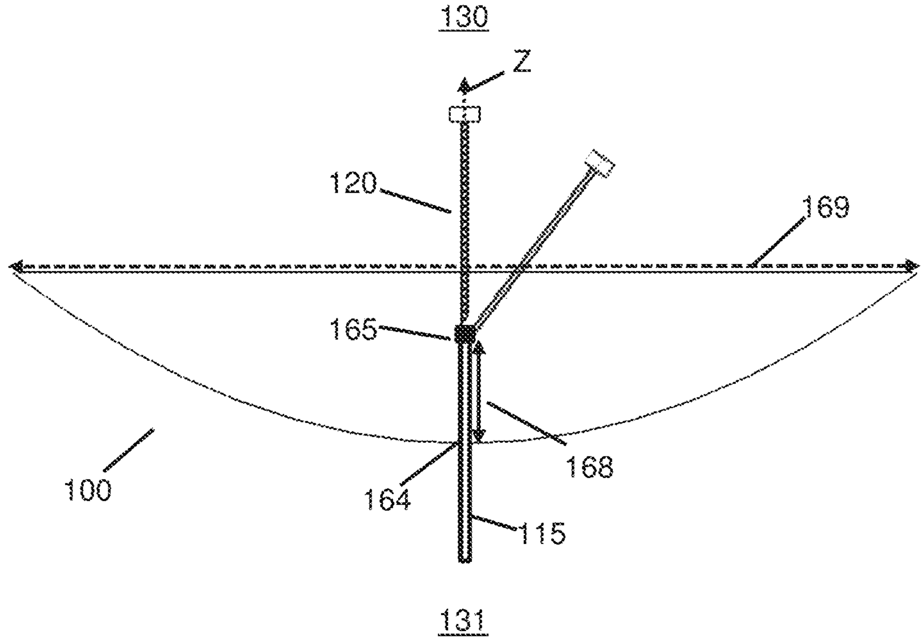
FIG. 1E illustrates another embodiment of an antenna including a mechanism enabling motion of at least part of a waveguide of the antenna.

When the mechanism 165 is located at the vertex 164 of the main reflector 101, the whole waveguide 120 (or most of it) which protrudes from the main reflector 101 is tilted with respect to the main reflector 101, as visible in FIG. 1E. In other words, the whole waveguide (or most of it) of the antenna 100 is tilted.

FIG. 1E shows a configuration in which the waveguide 120 is coupled to the first waveguide 115, wherein at least part of the first waveguide 115 protrudes from the main reflector 101 towards the space 130. In this case, the first waveguide 115 extends within the inner portion 131 of the antenna 100 and part of the first waveguide 115 protrudes out of the main reflector 101 towards the space 130.

The mechanism 165 is located at the interface between the first waveguide 115 and the waveguide 120. As visible in FIG. 1E, the mechanism 165 enables motion (rotation in azimuth and/or elevation) of the waveguide 120 with respect to the main reflector 101.

Figure 1F:
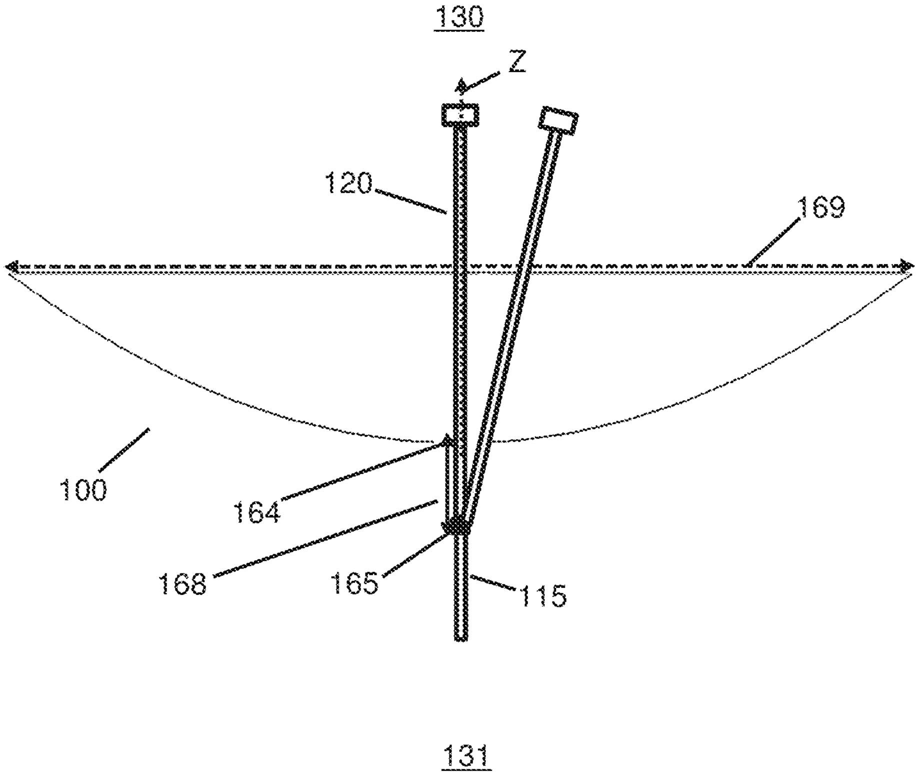
FIG. 1F illustrates another embodiment of an antenna including a mechanism enabling motion of at least part of a waveguide of the antenna.

FIG. 1F shows another configuration, in which the waveguide 120 includes a part which is located below the vertex 164 of the main reflector 100 (along axis Z). In other words, the waveguide 120 extends within the inner portion 131 of the antenna 100 and part of the waveguide 120 protrudes out of the main reflector 101 towards the space 130.

The waveguide 120 is coupled to the first waveguide 115 which is located in the inner portion 131 of the antenna 100.

The mechanism 165 is located at the interface between the first waveguide 115 and the waveguide 120. In this embodiment, the mechanism 165 is located in the inner portion 131 of the antenna 100. As visible in FIG. 1F, the mechanism 165 enables motion (rotation in azimuth and/or elevation) of the waveguide 120 with respect to the main reflector 101. The main reflector 101 can include an opening at its vertex 164 which enables this motion.

Figure 1G:
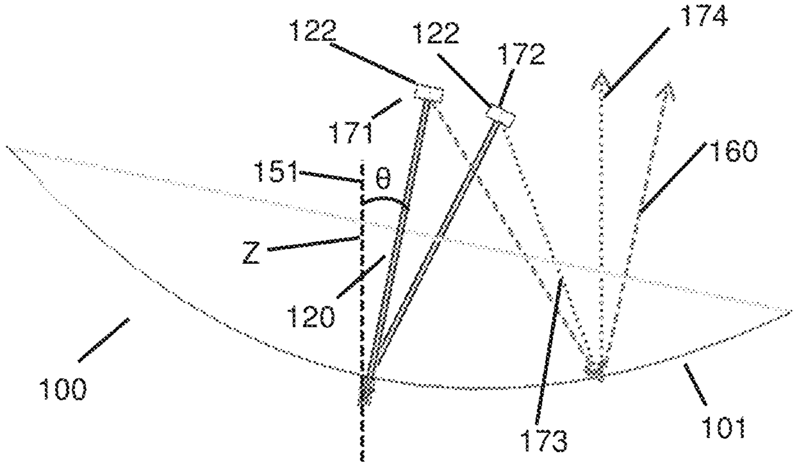
FIG. 1G illustrates an example of a compensation of the effect of vibrations on an antenna which operates in transmission.

Attention is now drawn to FIG. 1G.

As already explained with reference to FIG. 1B, the vibrations induce a displacement of the antenna 100, which, in turn, cause the beam 160 transmitted by the antenna 100 to the space 130 to have a direction which differs from the required direction 151.

As explained with reference to FIGS. 1D to IF, the mechanism 165 enables a displacement of the waveguide 120. The waveguide 120 is therefore controlled to be moved (e.g. rotated/tilted) about at least one axis, in order to compensate, at least partially, for the effect of the vibrations.

As shown in FIG. 1G, the waveguide 120 is moved from its original position 171, to a new position 172. At its new position 172, the waveguide 120 transmits (via the sub-reflector 122) the beam 173 to the main reflector 101, which, in turn, transmits the beam 174. The beam 174 is transmitted along the required direction (the required direction is depicted as arrow 151 in FIG. 1A). Note that the beam 174 includes a plurality of electromagnetic rays which are transmitted by the main reflector 101 as parallel to the required direction 151.

In other words, the effect of the vibrations on the antenna 100 is compensated (at least partially) by moving at least part of the waveguide 120.

Note that it is not necessary to move the whole antenna 100 (for example, it is not necessary to move the main reflector 101), but only part (or all) of the waveguide 120 (elements which are affixed to the waveguide 120 also move, such as the sub-reflector 122).

Figure 1H:
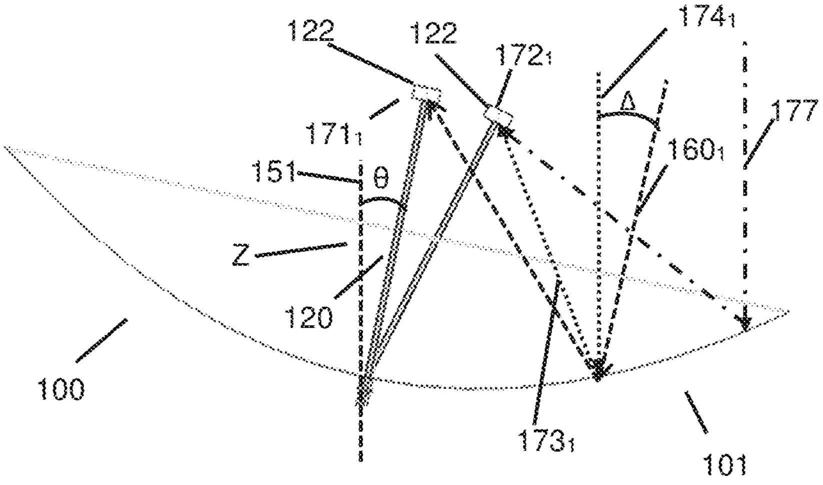
FIG. 1H illustrates an example of a compensation of the effect of vibrations on an antenna which operates in reception.

By virtue of the reciprocity effect, the same principles as described in the transmission mode can be used when then antenna operates in reception, as illustrated in FIG. 1H.

When the vibrations are not compensated, the vibrations induce a displacement of the antenna 100, which, in turn, cause the antenna 100 to fail (partially or totally) to collect the beam $174_1$ received from the required direction 151. To the contrary, the antenna 100 may collect beam $160_1$ (note that arrow $160_1$ can also correspond to an electromagnetic ray) which is not of interest (since it comes from a direction which differs from the required direction 151).

By using the mechanism 165, the waveguide 120 is therefore controlled to be moved (e.g. rotated/tilted) about at least one axis, in order to compensate, at least partially, for the effect of the vibrations.

As shown in FIG. 1H, the waveguide 120 is moved from its original position $171_1$, to a new position $172_1$. The main reflector 101 reflects the desired beam $174_1$ into beam 1731 towards the sub-reflector 122 affixed to the waveguide 120 located at its new position $172_1$. Therefore, the beam received along the required direction is received by the antenna 100. Note that by virtue of the shape of the main reflector, any electromagnetic ray (see e.g. reference 177) which is parallel to the required direction 151 is transmitted to the sub-reflector 122 and to the waveguide 120 located at its new position $172_1$.

Note that the examples of FIG. 1G and FIG. 1H are depicted with reference to the configuration of the antenna 100 as depicted in FIG. 1D. This is not limitative and the configuration of the antenna 100 as depicted in FIG. 1E or FIG. 1F can be used.

Figure 2A:
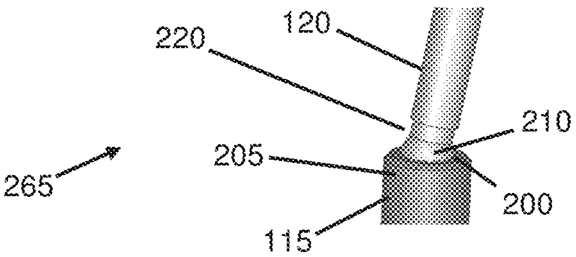
FIGS. 2A to 2C illustrate an embodiment of a mechanism enabling motion of at least part of a waveguide of the antenna.
Figure 2B:
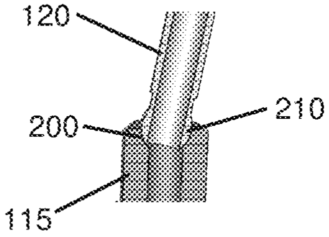

Attention is now drawn to FIGS. 2A and 2B.

FIG. 2A depicts an embodiment of the mechanism 165 (noted 265 in FIG. 2A). This embodiment is however not limitative.

In this embodiment, the mechanism 265 includes a socket 200 (e.g. a spherical socket) and a protrusion 210 (e.g. a spherical protrusion). Therefore, the protrusion 210 can rotate within the socket 200. In particular, the waveguide 120 can rotate around the center of the protrusion 210. This mechanism 265 is also called a ball joint.

This mechanism 265 enables a rotation of the waveguide 120 around at least two axes: azimuth axis and elevation axis. Note that in this specific example, the mechanism 265 enables also rotation around the Z axis (however, in order to compensate vibrations, it is not required to move the waveguide 120 about this axis).

In some embodiments, it is possible to use a mechanism 265 which enables motion along only one axis (azimuth or elevation). This can include e.g. a waveguide rotary joint or a waveguide rotating joint. This is not limitative.

In the example of FIG. 2A, the mechanism 265 is located at the interface between the first waveguide 115 and the waveguide 120. As a consequence, the socket 200 is located at an end 205 of the first waveguide 115 (this corresponds to the end 205 of the first waveguide 115 which is coupled to the waveguide 120) and the protrusion 210 is located at an end 220 of the waveguide 120 (this corresponds to the end 220 of the waveguide 120 which is coupled to the first waveguide 115).

Note that the mechanism 265 is only an example, and other mechanisms can be used, such as a waveguide rotary joint, a waveguide rotating joint, a flexible waveguide, etc. This list is not limitative.

As can be understood from the examples above, the mechanism (see e.g. 165 or 265) is located between two waveguides (e.g. between the first waveguide 115 and the waveguide 120). During operation of the antenna 100, electromagnetic radiations must be transmitted between the two waveguides. Assume that the mechanism includes at least a first mechanical element and a second mechanical element (mechanical pieces) which cooperate to enable the desired motion. In order to optimize performance of the antenna 100, the gap (air gap) between the first element and the second element has a dimension (e.g. a thickness) which is below a tenth (10 percent) of a wavelength $\lambda_{mean}$ informative of a range of wavelengths $[\lambda_{min}\lambda_{max}]$ at which the antenna 100 operates. In some embodiments, $\lambda_{mean}$, corresponds to $\lambda_{min}$ (minimal wavelength of operation) or $\lambda_{max}$ (maximal wavelength of operation) or to the average of $\lambda_{min}$ and $\lambda_{max}$. Since the first element and the second element are located in close proximity one to the other, the leakage of electromagnetic radiations out of the antenna 100 (antenna loss) is limited or even prevented.

Figure 2C:
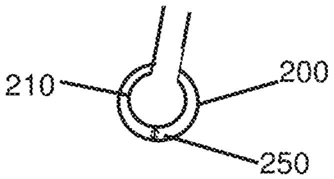

In the example of FIGS. 2A and 2B, the first mechanical element corresponds to the socket 200 and the second mechanical element corresponds to the protrusion 210. The gap between the socket 200 and the protrusion 210 is noted 250 (as visible in FIG. 2C).

Figure 3:
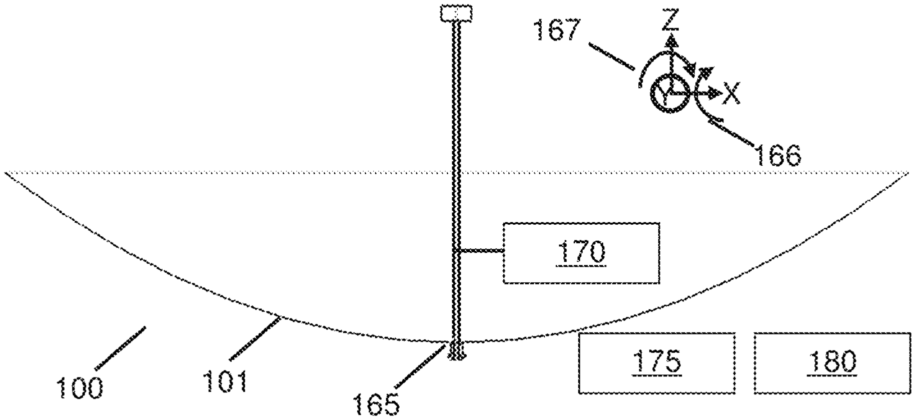
FIG. 3 illustrates an embodiment of an antenna including mechanical and electronic elements enabling control of the motion of the waveguide to compensate vibrations.

Attention is now drawn to FIG. 3.

In order to induce motion of the waveguide 120, the antenna 100 can include (or be operatively coupled to) an actuator 170, such as a motor. The actuator 170 can be used to control motion of at least part of the waveguide 120, in cooperation with the mechanism 165.

In some embodiments (such as in FIG. 3), the actuator 170 is operatively coupled to the waveguide 120 and induces a displacement of the waveguide 120. This displacement is guided by the mechanism 165, which enables at least one degree of freedom for displacement of the waveguide 120 with respect to the main reflector 101.

The antenna 100 can further include (or is operatively coupled to) at least one sensor 175 (or a plurality of sensors 175). The sensor 175 generates data (e.g. inertial data) usable to determine data $D_{motion}$ informative of a displacement of the antenna 100 over time (and/or of at least part of the antenna 100, such as of the main reflector 101). Note that the sensor 175 can be placed at various locations of the antenna 100. The sensor 175 can include e.g. a gyroscope, which measures angular velocity along the azimuth axis and/or the elevation axis, and an accelerometer which measures the gravitation direction. Integration of the angular velocity (by a processor and memory circuitry, such as controller 180) provides the position of the antenna over time. In some embodiments, the sensor 175 can include an inertial measurement unit (IMU). In some embodiments, the sensor 175 can include a position sensor.

In some embodiments, the antenna 100 includes a first sensor generating data usable to determine data informative of a displacement of the antenna 100 in a first range of frequencies (low frequencies), and a second sensor generating data usable to determine data informative of a displacement of the antenna in a second range of frequencies (high frequencies), wherein the average frequency of the first range is below the average frequency of the second range.

For example, the first sensor can be an accelerometer which measures the gravitation direction. This enables to determine the elevation angle. In particular, it can detect variations of the elevation angle at frequencies below 1 Hz. These variations can be due e.g. to the sun, which warms the platform (mast or pole) on which the antenna 100 is mounted. These variations occur at low frequencies (below 1 Hz).

The second sensor can be a gyroscope which measures vibrations at higher frequencies (e.g. up to 30 Hz). These vibrations are caused e.g. by wind.

Note that the source of vibrations and the frequency values as described above are not limitative.

The antenna 100 can further include (or is operatively coupled to) at least one controller 180. The controller 180 can include a processor and memory circuitry (not represented). The controller 180 can receive data from the sensor 175. The data can correspond to $D_{motion}$ or can be used to generate $D_{beam}$. The controller 180 can use the data of the sensor 175 to generate a command for the actuator 170, in order to control the motion of the waveguide 120, to compensate for the vibrations undergone by the antenna 100.

Figure 4:
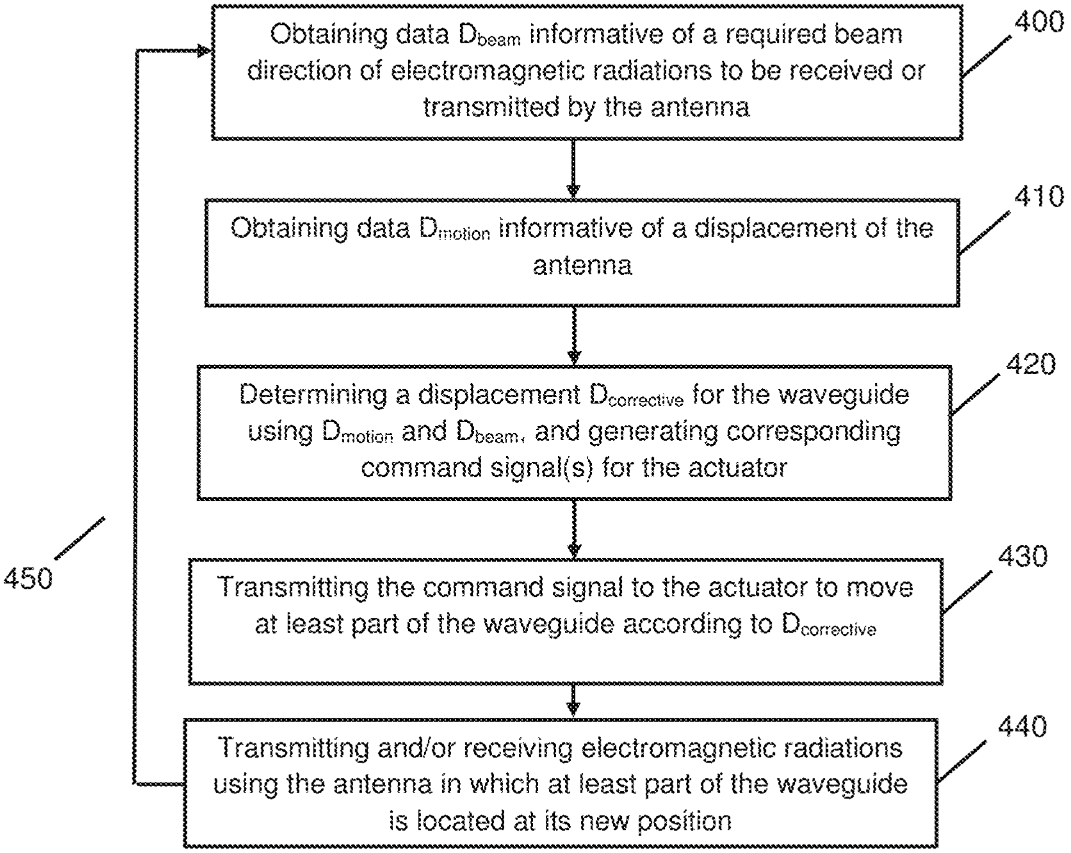
FIG. 4 illustrates a flow chart of a method of compensating the effect of vibrations on an antenna.

Attention is now drawn to FIG. 4, which describes a method of controlling the antenna 100.

The method includes obtaining (operation 400) data $D_{beam}$ informative of a required beam direction of electromagnetic radiations to be received or transmitted by the antenna 100. Data $D_{beam}$ can be obtained by the controller 180. In the example of FIGS. 1G and 1H, data $D_{beam}$ defines the direction 151 as the required direction. $D_{beam}$ can include e.g. a 2D or a 3D vector defining the required beam direction.

In some embodiments, $D_{beam}$ can be e.g. known in advance (because it is known that the antenna 100 needs to transmit electromagnetic radiations to a second antenna, and the position and orientation of the second antenna is known). In some embodiments, $D_{beam}$ can be measured (e.g. by obtaining position and orientation data of the second antenna).

$D_{beam}$ can be provided to the controller 180 by e.g. an operator of the antenna 100 (using a computerized interface), and/or by a system which communicates with the antenna 100.

In the example of FIG. 1A. $D_{beam}$, defines the required direction 151 as a zero angle tilt (with respect to the Z axis). Note that this is not limitative, and in some embodiments, the tilt angle of the required beam direction can be non-zero (in reception and/or in transmission).

The method further includes obtaining (e.g. by controller 180) data $D_{motion}$ informative of a displacement of the antenna 100 (operation 410). As mentioned above, $D_{motion}$ can be provided by the sensor 175, or can be generated using data provided by the sensor 175. $D_{motion}$ can include e.g. the displacement (e.g. angular displacement) of the antenna 100 (or at least of the main reflector 101) about the azimuth axis and/or elevation axis. FIG. 3 illustrates an angular displacement (rotation) in azimuth (see arrow 166 which illustrates a rotation about axis X) and an angular displacement (rotation) in elevation (see arrow 167 which illustrates a rotation about axis Y). Note that the definition of the azimuth axis and of the elevation axis is a matter of convention. Therefore, in another convention, a rotation in azimuth can correspond to arrow 167 and a rotation in elevation can correspond to arrow 166.

In some embodiments, operation 410 can include measuring angular velocities along the azimuth axis and/or elevation axis and integrating the velocity along the azimuth axis and/or elevation axis to get the angular displacement along the azimuth axis and/or elevation axis.

The method further includes (operation 420) determining a displacement (corrective displacement) $D_{corrective}$ for the waveguide 120 (or for at least part of it) using $D_{motion}$ and $D_{beam}$.

When the antenna 100 operates in transmission, $D_{corrective}$ is determined such that, when the waveguide 120 moves according to $D_{corrective}$, the direction of the beam transmitted by the antenna 100 corresponds to the required beam direction obtained at operation 400.

When the antenna 100 operates in reception, $D_{corrective}$ is determined such that, when the waveguide 120 moves according to $D_{corrective}$, an incoming electromagnetic beam (or incoming electromagnetic ray) which has the required beam direction, is reflected by the main reflector 101 towards the sub-reflector 122, and then to the waveguide 120.

Note that in some embodiments, the antenna 100 can operate simultaneously (or quasi simultaneously) both in reception and transmission. If the required beam direction is the same for reception and transmission, the waveguide 120 is moved to ensure both reception and transmission according to this required beam direction.

Operation 420 can be performed by the controller 180. Based on this displacement $D_{corrective}$, the controller 180 can generate the command (e.g. electrical signal) to be transmitted to the actuator 170, in order to command the actuator 170 to move at least part of the waveguide 120 according to the displacement $D_{corrective}$. In some embodiments, the controller 180 determines $D_{corrective}$ which is transmitted to a motor driver, which converts $D_{corrective}$ into electrical signals to be transmitted to the actuator 170. In particular, as explained hereinafter, the electrical signals can correspond to electrical currents to be applied to inductors of the actuator 170.

In some embodiments, the displacement is determined along one axis (e.g. angular rotation in azimuth or angular rotation in elevation). In some embodiments, the displacement is determined along two axes (e.g. rotation in both azimuth and elevation).

Assume for example that the angular displacement of the antenna 100 (due to the vibrations) in elevation is noted $\theta$ (see FIG. 1G).

The corrective displacement $D_{corrective}$ can be calculated as follows: $a_1\theta+a_2\theta^3$, wherein $a_1$ and $a_2$ are coefficients which depend on the shape and dimensions of the main reflector 101. For example, for a typical dish antenna, which has a "f over D ratio" (corresponding to the ratio between the focal length of the antenna 100 and the diameter 169 of the main reflector 101) equal to 0.4, $a_1$=1.1 and $a_2$=0. This is not limitative. If the f over D ratio is different, the values of $a_1$ and $a_2$ can be tuned accordingly, using an electromagnetic simulation software (the dimensions and shape of the antenna are provided to the electromagnetic simulation software which provide direction of the beam depending on the tilt of the waveguide 120).

In other words, at least part of the waveguide 120 must be rotated in elevation with an angular rotation equal to $a_1\theta+a_2\theta^3$.

Similarly, if the displacement of the antenna 100 along the azimuth axis is noted $\varphi$ (not represented), the corrective displacement $D_{corrective}$ can be calculated as follows: $a_1\varphi+a_2\varphi^3$. The values for at and $a_2$ used for the azimuth motion can be used for the elevation motion.

Note that these formulas are not limitative and other formulas can be used.

The method further includes transmitting (e.g. by the controller 180) the command signal(s) (as determined at operation 420) to the actuator 170 (operation 430). At least part of the waveguide 120 (together with the sub-reflector 122) is moved by the actuator 170 (as mentioned above, the mechanism 165 enables a motion of the waveguide 120) to reach its new position (see position 172 in FIG. 1G and position $172_1$ in FIG. 1H).

The method further includes transmitting (operation 440) electromagnetic radiations using the antenna 100 in which the waveguide 120 has reached its new position. In the example of FIG. 1G, the direction of the beam 174 transmitted by the antenna 100 matches the required beam direction 151 according to a matching criterion. The matching criterion can define e.g. the maximal angular error (between the required beam direction and the actual beam direction). In some embodiments, the matching criterion defines that the maximal angular error is less than quarter of the beam width (the beam width defines the angular opening of the beam transmitted or received by the antenna).

Similarly, operation 440 can include receiving (operation 440) electromagnetic radiations using the antenna 100 in which the waveguide 120 has reached its new position.

When the antenna 100 operates in reception, the antenna 100 receives an electromagnetic beam which matches the required beam direction 151 according to a matching criterion. The matching criterion can define that any electromagnetic beam which has a direction which differs from the required beam direction by a value which is equal to or below the maximal angular error, is received by the antenna (whereas an electromagnetic beam which has a direction which differs from the required beam direction by a value which is above the maximal angular error is not received by the antenna, or received with an amplitude below a threshold, such as 1 dB—this value being not limitative). In some embodiments, the maximal angular error is less than quarter of the beam width to be received by the antenna 100.

In the example of FIG. 1H, the beam $\mathbf{174_1}$ received by the antenna 100 matches the required beam direction 151 according to the matching criterion and is therefore collected by the waveguide 120. To the contrary, beam $\mathbf{160_1}$ (note that arrow $\mathbf{160_1}$ can also correspond to an electromagnetic ray) does not match the required beam direction 151 according to the matching criterion, since its angular deviation $\Delta$ with respect to the required beam direction is above the maximal angular error. Therefore, beam $\mathbf{160_1}$ is not received by the waveguide 120.

As visible in FIG. 4 (see reference 450), the method of FIG. 4 can be repeated over time. If the required beam direction does not change, then operations 410 to 440 can be repeated, since the vibrations applied to the antenna 100 can change over time, and it is therefore needed to update the corrective displacement to compensate for these vibrations.

If the required beam direction changes, then operations 400 to 440 can be repeated.

A real time (or quasi real time) compensation of the vibrations can be obtained. The frequency at which the method of FIG. 4 is repeated can be set e.g. by an operator depending on the frequency of vibrations which need to be compensated. If necessary, this frequency can be changed over time. In some embodiments, the frequency of the vibrations is measured and the frequency at which the method of FIG. 4 is repeated is dynamically adjusted depending on the frequency of the vibrations.

Figure 5A:
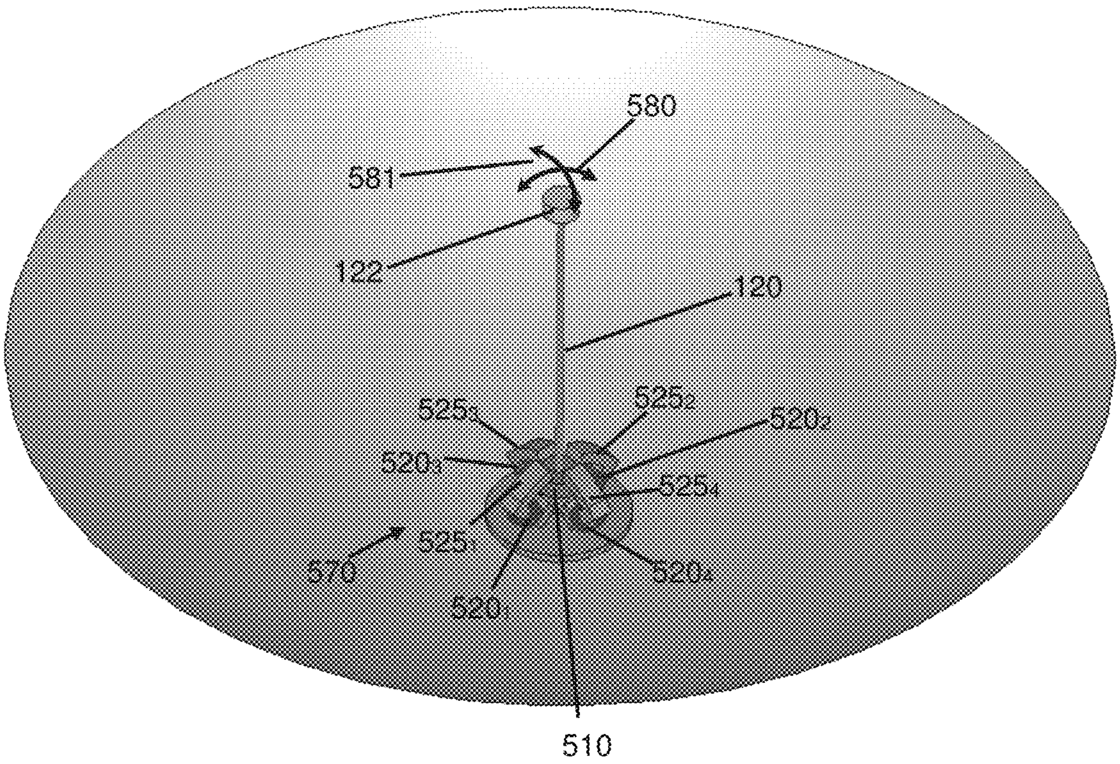
FIG. 5A illustrates an embodiment of an actuator to control motion of at least part of a waveguide of the antenna.
Figure 5B:
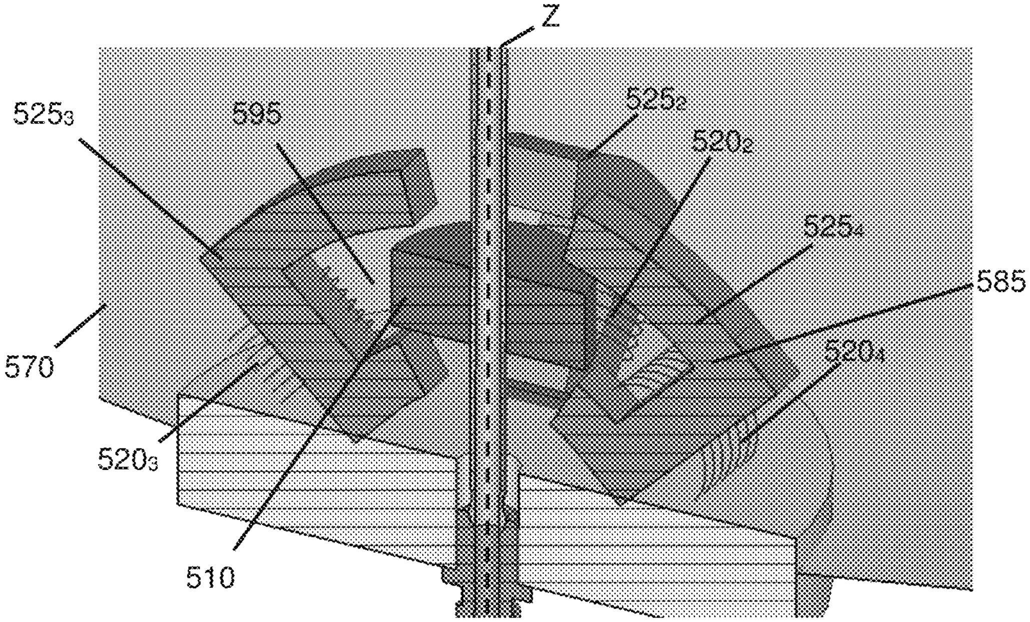
FIG. 5B illustrates a cross-sectional view of the actuator of FIG. 5A.

Attention is now drawn to FIG. 5A and FIG. 5B, which depicts an embodiment of the actuator 170 (in FIG. 5A, the actuator is noted 570). Note that this embodiment is not limitative and other actuators can be used.

The actuator 570 includes a magnet 510 (e.g. a permanent magnet) coupled (e.g. affixed) to the waveguide 120. In the non-limitative example of FIG. 5A, the magnet 510 has a through hole at its center. The waveguide 120 expands through this through hole. This is however not limitative and other methods can be used to affix the magnet 510 to the waveguide 120.

The actuator 570 further includes a first ferromagnetic element 525$_1$ and a second ferromagnetic element 5252. The first ferromagnetic element 525$_1$ is located opposite to the second ferromagnetic element 5252 with respect to the waveguide 120. Examples of ferromagnetic elements include e.g. iron and/or steel (this is not limitative).

The actuator 570 includes at least one inductor, which can be associated with the first ferromagnetic element 525$_1$ and/or with the second ferromagnetic element 5252. The inductor can include an insulated wire wound into a coil. The inductor can be therefore be wrapped around the first ferromagnetic element 525$_1$ and/or the second ferromagnetic element 525 (in order to be able to magnetize the corresponding ferromagnetic element). Note that the inductor does not need to be in direct contact with the corresponding ferromagnetic element (an insulating layer can be present on the ferromagnetic element).

As explained hereinafter, a inductor associated with one of the two opposite ferromagnetic elements enables displacement of the waveguide 120 along one axis (see arrow 580—this corresponds e.g. to an azimuth or elevation rotation depending on the convention). In particular, a rotation about an axis orthogonal to an axis joining the two opposite ferromagnetic elements can be obtained. It is however possible (as in the non-limitative embodiment of FIG. 5A) to use two inductors (or more), each inductor being associated with a ferromagnetic element.

In the absence of electrical currents applied to the inductor, the two opposite ferromagnetic elements maintain the magnet 510 at its equilibrium position (with a tilt of zero degrees).

In FIG. 5A, the actuator 570 includes a first inductor 5201 associated with the first ferromagnetic element 525$_1$ and a second inductor 5202 associated with the second ferromagnetic element 5252.

In the embodiment of FIG. 5A, the first pair of elements (which includes the first inductor 5201 and the first ferromagnetic element 525*i*) is located opposite to the second pair of elements (which includes the second inductor 5202 and the second ferromagnetic element 5252) with respect to the waveguide 120. In particular, the first pair of elements faces a first side of the magnet 510 and the second pair of element faces a second side of the magnet 510, which is opposite to the first side.

The first pair and the second pair of elements enable controlling motion of the waveguide 120 along direction 580.

In some embodiments, the actuator 570 can include additional elements.

The actuator 570 can include a third ferromagnetic element 525$_3$ and a fourth ferromagnetic element 525$_4$. The third ferromagnetic element 525$_3$ is located opposite to the fourth ferromagnetic element 525 with respect to the waveguide 120.

The actuator 570 can include at least one additional inductor, which can be associated with the third ferromagnetic element 525$_3$ and/or with the fourth ferromagnetic element 525$_4$. The additional inductor is therefore located in the vicinity of the third ferromagnetic element 525$_3$ and/or of the fourth ferromagnetic element 525$_4$ (in order to be able to magnetize the corresponding ferromagnetic element).

An inductor associated with one of the two opposite ferromagnetic elements 525$_3$, 525$_4$ enables displacement of the waveguide 120 along an additional axis (see arrow 581—this corresponds e.g. to an azimuth or elevation rotation depending on the convention). It is however possible (as in the non-limitative embodiment of FIG. 5A) to use two inductors (or more), each inductor being associated with a ferromagnetic element.

In FIG. 5A, the actuator 570 includes a third inductor 520$_3$ associated with the third ferromagnetic element 525$_3$ and a fourth inductor 520$_4$ associated with the fourth ferromagnetic element 525.

In the embodiment of FIG. 5A, the third pair of elements (which includes the third inductor 520$_3$ coupled to the third ferromagnetic element 525$_3$) is located opposite to the fourth pair of elements (which includes the fourth inductor 520$_4$ and the fourth ferromagnetic element 525$_4$) with respect to the waveguide 120. In particular, the third pair of elements faces a second side of the magnet 510 and the fourth pair of elements faces a side of the magnet 510, which is opposite to the second side.

If four ferromagnetic elements are used (and at least two inductors, one per axis), each ferromagnetic element can be located (in a plane X-Y orthogonal to the main axis Z of the waveguide 120) at a 90-degree angle to its adjacent ferromagnetic element.

In the non-limitative example of FIG. 5A in which four pairs of elements are used, each pair of elements is located (in a plane X-Y orthogonal to the main axis Z of the waveguide 120) at a 90-degree angle to its adjacent pair of elements.

Note that another number of elements can be used: for each axis along which the motion of the waveguide 120 has to be controlled, two ferromagnetic elements (located opposite one to the other with respect to the waveguide 120) and at least one inductor coupled to one of the two ferromagnetic elements can be used.

Note that the ferromagnetic elements can be connected to the body of the antenna 100 using appropriate mechanical connections.

Figure 5C:
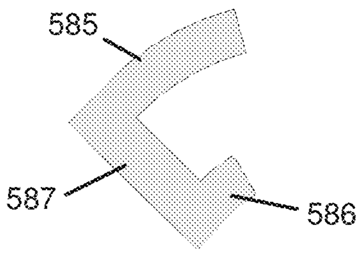
FIG. 5C illustrates a cross-sectional view of a ferromagnetic element usable in the actuator of FIG. 5A.
Figure 5D:
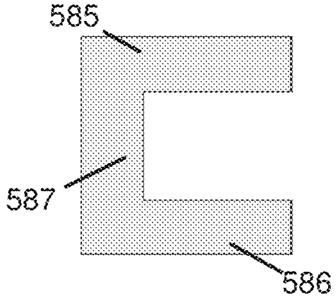
FIG. 5D illustrates a cross-sectional view of another ferromagnetic element usable in the actuator of FIG. 5A.

Attention is now drawn to FIGS. 5B to 5D. FIG. 5B illustrates a cross section of the actuator 570 (therefore, only three pairs of elements are visible in FIG. 5B).

In the non-limitative example of FIG. 5B, the cross-section of each ferromagnetic element has a shape which is similar to a U ("U-shaped" ferromagnetic elements). The magnet 510 can extend at least partially within a cavity 595 defined by the interior portion of the shape of each ferromagnetic element.

In some embodiments, each ferromagnetic element can act as a yoke which surrounds the magnet 510.

Assume that a Z-axis (oriented towards the outer space of the antenna 100) corresponds to the axis of revolution of the waveguide 120.

Each ferromagnetic element (or at least one of the ferromagnetic elements) can include two portions (corresponding to the two "arms" of the "U"): a first arm 585 is located at least partially above the magnet 510 (along axis Z), and a second arm 586 is located at least partially below the magnet 510 (along axis Z). A third arm 587 joins the first arm 585 to the second arm 586. In FIG. 5B, at least part of the first arm 585 surrounds the magnet 510. This is not limitative, and the lengths of the first arm 585 and/or of the second arm 586 can be selected such that the first arm 585 and/or of the second arm 586 does not surround the magnet 510.

The first arm 585 and the second arm 596 can be substantially parallel. In some embodiments, the first arm 585 and the second arm 596 can have a curved profile (see FIG. 5C).

Note that the first arm 585 and the second arm 586 can have different lengths. This is illustrated in FIG. 5C. In other embodiments (see FIG. 5D), the first arm 585 and the second arm 586 can have the same length.

Figure 6A:
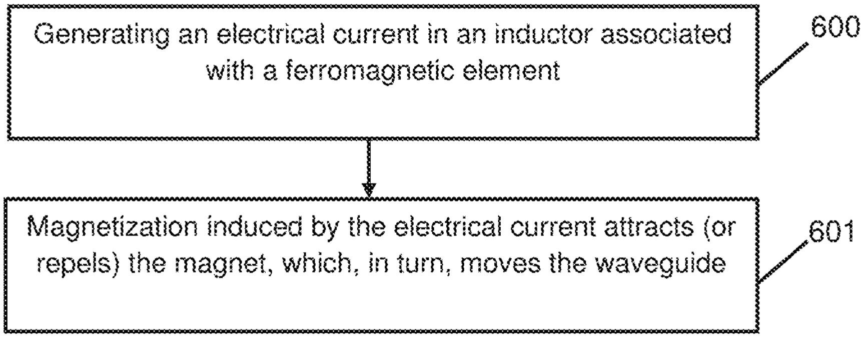
FIG. 6A illustrates a flow chart of a method of compensating the effect of vibrations on an antenna, using an actuator including elements depicted in FIG. 6B.
Figure 6B:
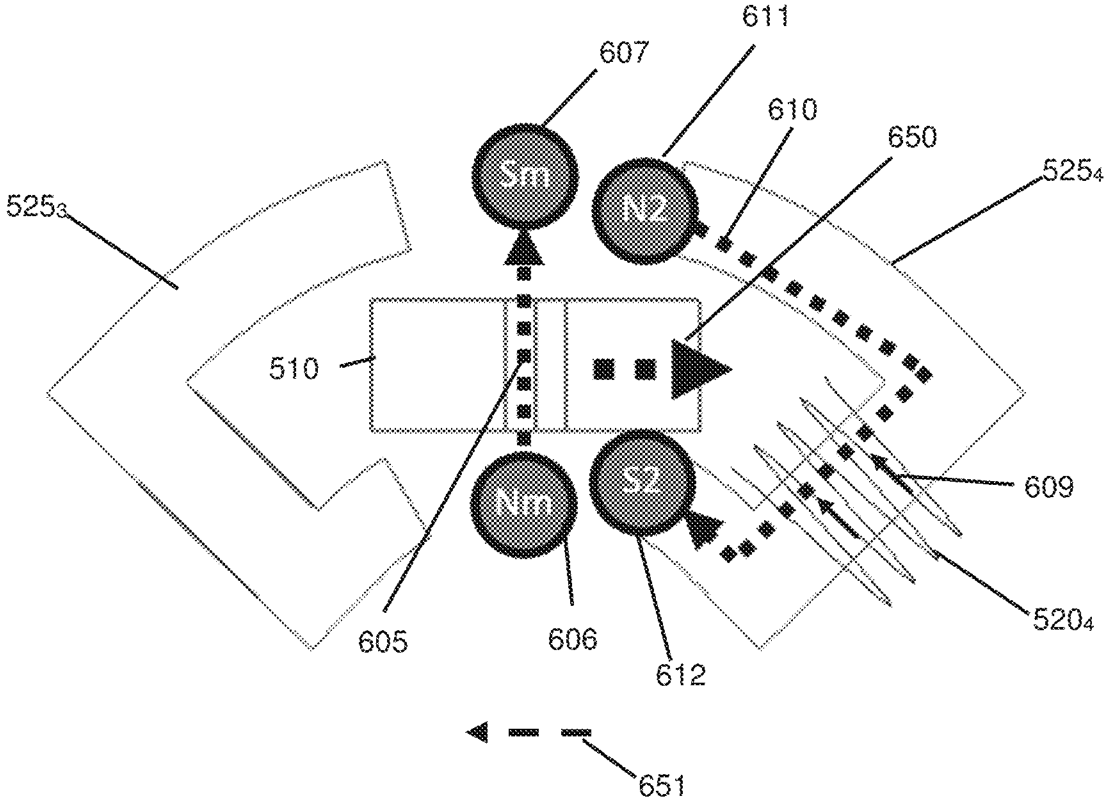
FIG. 6C illustrates a flow chart of a method of compensating the effect of vibrations on an antenna, using an actuator including elements depicted in FIG. 6D.

Attention is now drawn to FIGS. 6A and 6B, which describe a method of controlling the motion of the waveguide 120, using an actuator including at least two opposite ferromagnetic elements and at least one inductor associated with one of the ferromagnetic elements.

The method includes generating (operation 600) an electric current in the inductor (e.g. inductor 520$_4$). An electrical generator (controlled e.g. by the controller 180) can be used to generate the electrical current applied to the inductor(s). The electrical generator is not represented in the drawings.

The magnet 510 has a magnetic dipole moment with North Pole 606 and South Pole 607.

Since an electric current 609 is present in the inductor 520$_4$, it acts as a magnet (operation 601) which is associated with a magnetic dipole moment 610 (magnetic flux). The magnetic dipole moment 610 has a north pole 611 and a south pole 612. It expands through the shape (in particular through the first portion, the second portion and the third portion) of the ferromagnetic element 525$_4$. Due to the presence of the ferromagnetic element 525$_4$, the magnetization induced by the inductor 520$_4$ flows through the ferromagnetic element 525$_4$. The ferromagnetic element 525$_4$ enables to transfer the magnetic field induced by the inductor 520$_4$ in the vicinity of the magnet 510.

According to the laws of Physics, there is attraction between south and north poles and repulsion between two south poles and between two north poles.

In the configuration of FIG. 6B, the south pole Sm 607 is attracted by the north pole N2 611. The north pole Nm 606 is attracted by the south pole S2 612.

In other words, the electric current 609 enables to generate an attraction force (magnetic force) in the direction 650. The magnet 510 is therefore moved in the direction 650. Since the magnet 510 is coupled to the waveguide 120, the waveguide 120 is moved in the direction 650. Motion of the waveguide 120 is guided by the mechanism 165.

If it is desired to move the waveguide 120 in a direction 651 which is opposite to the direction 650, an electrical current which has an opposite direction (that is to say opposite sign) to the electrical current 609, is applied to the inductor 520$_4$.

Figure 6C:
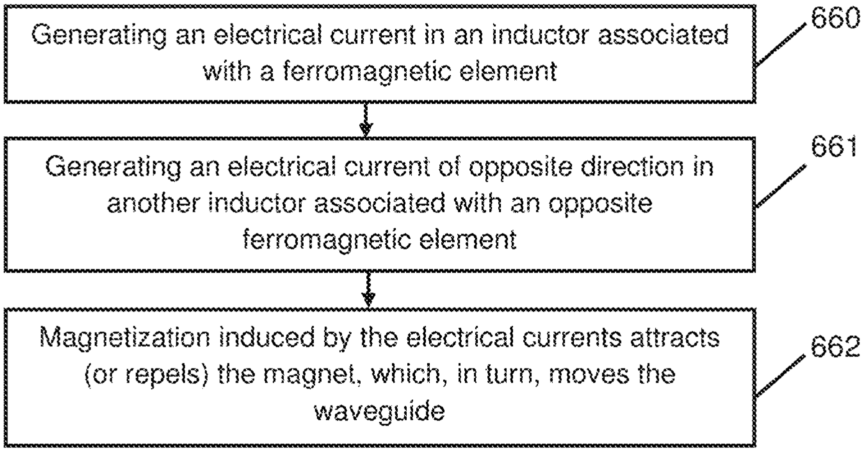
Figure 6D:
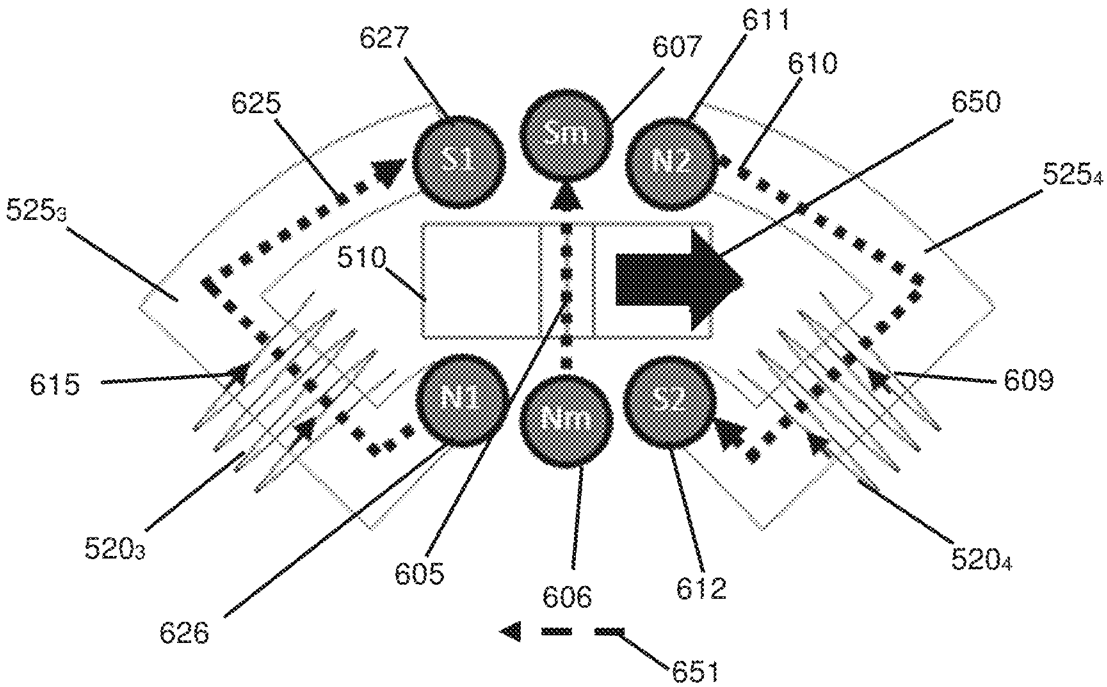

FIGS. 6C and 6D describe a variant of the method of FIGS. 6A and 6B. In FIG. 6D, two opposite pairs of elements (each pair including a ferromagnetic element and an inductor) are used to control motion of the waveguide 120 along one axis.

The magnet 510 has a magnetic dipole moment 605 with north pole 606 and south pole 607.

An electric current 609 is applied (operation 660) to an inductor (e.g. coil 520$_4$). Since an electric current 609 is present in the inductor 520$_4$, it acts as a magnet which is associated with a magnetic dipole moment 610. The magnetic dipole moment 610 has a north pole 611 and a south pole 612. It expands through the shape (in particular through the first arm, the second arm and the third arm) of the ferromagnetic element 525$_4$. Due to the presence of the ferromagnetic element 525$_4$, the magnetization induced by the inductor 520$_4$ flows through the ferromagnetic element 525$_4$.

An electric current 615 is applied (operation 661) to another inductor (e.g. inductor 520$_3$). The electric current 615 flows in the inductor 520$_3$ in a direction which is opposite to the direction in which the electric current 609 flows in the inductor 520$_4$ (current of opposite sign). Due to the presence of the ferromagnetic element 525$_4$, the magnetization induced by the inductor 520$_4$ flows through the ferromagnetic element 525.

Since an electric current 615 is present in the inductor 520$_3$, it acts as a magnet which is associated with a magnetic dipole moment 625. The magnetic dipole moment 625 has a north pole 626 and a south pole 627. It expands through the shape (in particular through the first portion, the second portion and the third portion) of the ferromagnetic element 525$_3$. Due to the presence of the ferromagnetic element 525$_3$, the magnetization induced by the inductor 520$_3$ flows through the ferromagnetic element 520$_3$.

In some embodiments, the amplitude of the electric current 609 is equal to the amplitude of the electric current 615. This is however not mandatory.

In the configuration of FIG. 6D, the south pole Sm 607 is attracted by the north pole N2 611 and is repelled from the south pole S1 627.

The north pole Nm 606 is attracted by the south pole S2 612 and is repelled from the north pole N1 626.

In other words, the electric currents 609, 615 enable to generate an attraction force in the direction 650. The magnet 510 is therefore moved in the direction 650 (operation 662). Note that the attraction force generated in FIG. 6D is of larger amplitude than in FIG. 6B, because two inductors are used. Since the magnet 510 is coupled to the waveguide 120, the waveguide 120 is moved in the direction 650 (as mentioned above, the mechanism 165 enables motion of the waveguide 120).

If it is desired to move the waveguide 120 in a direction 651 which is opposite to the direction 650, an electrical current which has an opposite direction (opposite sign) to the electrical current 609 is applied to the inductor 520$_4$, and an electrical current which has an opposite direction (opposite sign) to the electrical current 615 is applied to the inductor 520$_3$.

The actuator as described above is not limitative and, in some embodiments, or actuators or motors can be used (e.g. an electrical motor mechanically coupled to the waveguide 120).

It is to be noted that the various features described in the various embodiments may be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. An antenna, comprising:

a main reflector, a waveguide, wherein at least part of the waveguide protrudes towards a region external to the antenna, wherein the antenna is operative to transmit electromagnetic radiations between the waveguide and the main reflector, and an actuator operative to displace at least part of the waveguide, the actuator comprising:

a magnet coupled to the at least part of the waveguide, a first ferromagnetic element, a second ferromagnetic element, and at least one inductor associated with at least one of the first ferromagnetic element or the second ferromagnetic element.

2. The antenna of claim 1, wherein:

at least part of the waveguide protrudes from the main reflector, or the waveguide is coupled to a first waveguide, wherein at least part of the first waveguide protrudes from the main reflector.

3. The antenna of claim 1, comprising a mechanism which enables displacement of at least part of the waveguide with respect to the main reflector.

4. The antenna of claim 3, wherein:

a position of the mechanism matches a position of a vertex of the main reflector according to a proximity criterion, or the mechanism is located at an interface between the first waveguide and the waveguide.

5. The antenna of claim 3, wherein the mechanism enables at least one of:

a displacement in azimuth of the at least part of the waveguide, or a displacement in elevation of the at least part of the waveguide.

6. The antenna of claim 3, wherein the mechanism includes a ball joint.

7. The antenna of claim 3, wherein the mechanism comprises a first element operatively coupled to a second element, wherein a gap between the first element and the second element has a dimension which is below a tenth of a wavelength informative of a range of wavelengths in which the antenna operates.

8. The antenna of claim 1, comprising:

a sensor generating data usable to determine data $D_{motion}$ informative of a displacement of the antenna, and a controller operative to obtain data $D_{beam}$ informative of a required beam direction of electromagnetic radiations to be received or transmitted by the antenna, wherein the controller is operative to perform (i) or (ii):

(i) determining a displacement $D_{corrective}$ for the at least part of the waveguide using $D_{motion}$ and $D_{beam}$;

(ii) determining a displacement $D_{corrective}$ for the at least part of the waveguide using $D_{motion}$ and $D_{beam}$, for which a beam direction of electromagnetic radiations received or transmitted by the antenna, after said displacement $D_{corrective}$ of said at least part of the waveguide, matches the required beam direction according to a matching criterion.

9. The antenna of claim 1, comprising:

a first sensor generating data usable to determine data informative of a displacement of the antenna in a first range of frequencies, and a second sensor generating data usable to determine data informative of a displacement of the antenna in a second range of frequencies, wherein an average frequency of the first range is below an average frequency of the second range.

10. The antenna of claim 1, wherein an electric current generated in the at least one inductor enables displacement of the magnet and of the at least part of the waveguide.

11. The antenna of claim 1, wherein the at least one inductor comprises a first inductor associated with the first ferromagnetic element and a second inductor associated with the second ferromagnetic element, wherein an electric current generated in at least one of the first inductor or the second inductor enables displacement of the magnet and of the at least part of the waveguide.

12. The antenna of claim 1, wherein at least one of (i) or (ii) is met:

(i) the first ferromagnetic element is a U-shaped ferromagnetic element; or (ii) the second ferromagnetic element is a U-shaped ferromagnetic element.

13. The antenna of claim 1, wherein at least one of the first ferromagnetic element or the second ferromagnetic element includes:

a first arm located at least partially above the magnet, a second arm located at least partially below the magnet, and a third arm joining the first arm to the second arm.

14. The antenna of claim 1, wherein the electric current enables generation of a magnetic force operative to attract or repel the magnet, thereby moving the at least part of the waveguide.

15. The antenna of claim 1, wherein the at least one inductor comprises a first inductor and a second inductor, wherein (i) or (ii) is met:

(i) an electric current generated in at least one of the first inductor or the second inductor enables displacement of the magnet and of the at least part of the waveguide;

(ii) the antenna is configured to generate a first current in the first inductor, and a second current in the second inductor, wherein the second current has a sign opposite to the first current.

16. The antenna of claim 1, wherein the at least one inductor comprises a first inductor associated with the first ferromagnetic element, wherein the actuator further comprises a third ferromagnetic element, a second inductor associated with the third ferromagnetic element, and a fourth ferromagnetic element, wherein an electric current generated in the first inductor enables displacement of the magnet and of the at least part of the waveguide along a first direction, and an electric current generated in the second inductor enables displacement of the magnet and of the at least part of the waveguide along a second direction, different from the first direction.

17. The antenna of claim 16, wherein the at least one inductor comprises a third inductor associated with the second ferromagnetic element, wherein the actuator further comprises a fourth inductor associated with the fourth ferromagnetic element, wherein electric currents generated in the first and third inductors with an opposite sign enable displacement of the magnet and of the at least part of the waveguide along the first direction, and wherein electric currents generated in the second and fourth inductors with an opposite sign enable displacement of the magnet and of the at least part of the waveguide along the second direction, different from the first direction.

18. A method of controlling an antenna comprising a main reflector and a waveguide, the method comprising, by a processor and memory circuitry:

obtaining data $D_{beam}$ informative of a required beam direction of electromagnetic radiations to be received or transmitted by the antenna;

obtaining data $D_{motion}$ informative of a displacement of the antenna; and determining a displacement $D_{corrective}$ for at least part of the waveguide using $D_{motion}$ and $D_{beam}$, for which a beam direction of electromagnetic radiations received or transmitted by the antenna, after said displacement $D_{corrective}$ of said at least part of the waveguide, matches the required beam direction according to a matching criterion.

19. The method of claim 18, comprising controlling an actuator of the antenna to move the at least part of the waveguide according to said displacement $D_{corrective}$.

20. The method of claim 18, wherein the antenna comprises an actuator operative to displace at least part of the waveguide, the actuator comprising:

a magnet coupled to the at least part of the waveguide, a first ferromagnetic element, a second ferromagnetic element, and at least one inductor, associated with at least one of the first ferromagnetic element or the second ferromagnetic element.

* * * * *